G. COLMER.
Dose Measurer.
No. 197,017. Patented Nov. 13, 1877.
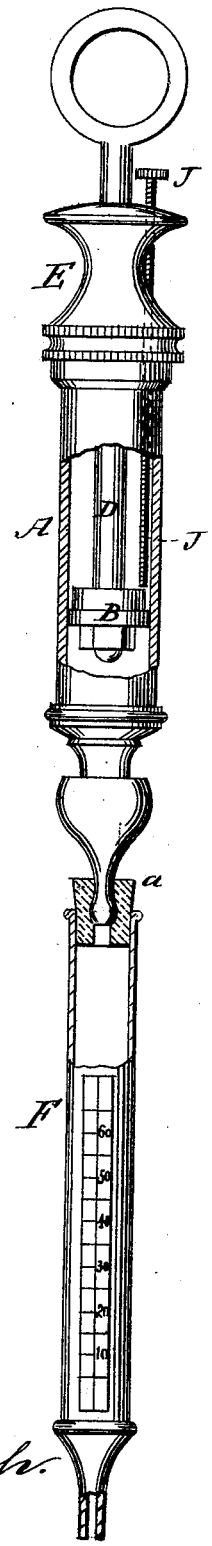
WITNESSES:
INVENTOR:
G. Colmer
ATTORNEYS.

UNITED STATES PATENT OFFICE.

GEORGE COLMER, OF SPRINGFIELD, LOUISIANA.

IMPROVEMENT IN DOSE-MEASURERS.

Specification forming part of Letters Patent No. 197,017, dated November 13, 1877; application filed October 6, 1877.

*To all whom it may concern:*

Be it known that I, GEORGE COLMER, M. D., of Springfield, in the parish of Livingston and State of Louisiana, have invented a new and Improved Dosimeter, of which the following is a specification:

Owing to the uncertainty in measuring fluids by drops, as often ordered by physicians, and also in measuring minims, I have invented what I shall denominate a "dosimeter," or dose-measure, which will enable an apothecary or nurse to determine with certainty the precise dose, by drops or minims, which is ordered, and to enable an apothecary to dispense, or a nurse to administer, each dose with great facility and safety.

The nature of my invention consists in a graduated transparent tube, which has a tapered end, like a urethra or ear syringe, and which is graduated for indicating drops or minims, drams, or other measure, in combination with a syringe having an adjustable stem or rod, which will stop the upward stroke of the plunger when a given quantity of fluid has been drawn or forced into the said graduated tube, as will be understood from the following description.

In the annexed drawing I have represented the improved dosimeter with syringe attachment, partly in section.

The letter A designates a well-known kind of syringe, which may be made of hard rubber, or of any other suitable material, and which may be of any desired size.

Inside of the tube of this syringe is a plunger or piston, B, which is applied to a rod, D, that is suitably packed where it passes through the flanged cap E.

The lower end of the syringe-tube A is bulbous or conical, and adapted to fit tightly into the stopple $a$ of a glass or other transparent tube, F. This tube is suitably graduated for minims, drops, drams, or any other fluid measure, and its lower end is tapered so as to leave a fine capillary orifice.

Glass or other transparent tubes of this kind, and for the purpose specified, may be made of various sizes and shapes, and they may be permanently or detachably applied to the syringes.

J designates a rod with a suitable head or top, which I screw, either with or without the addition of a screw-thread and a top, through the flanged cap E, so that it will enter the upper end of the syringe. This rod is adjustable endwise, and, by turning it, it may be introduced any desired distance into the tube of the syringe.

By adjusting stem or rod J it will stop the upward stroke of the piston B at any desired point. I am thus able to positively regulate the quantity of liquid drawn or forced up into the graduated glass tube. If the nozzle of the graduated transparent tube F be made very small, not a drop of fluid will escape from it until pressure is applied to the piston B.

Having thus described my invention, I claim as new and desire to secure by Letters Patent—

The combination of a transparent graduated tube, F, stopple $a$, syringe A, and adjustable stop-rod J, substantially in the manner and for the purposes specified.

GEO. COLMER, M. D.

Witnesses:
JOHN SETTOON,
W. B. ROUND.